US006233335B1

(12) United States Patent
Ludeman

(10) Patent No.: US 6,233,335 B1
(45) Date of Patent: May 15, 2001

(54) BATTERY SWITCHING SUBSCRIBER LOOP INTERFACE CIRCUIT

(75) Inventor: Christopher Ludeman, Palm Bay, FL (US)

(73) Assignee: Intersil Corporation, Palm Bay, FL (US)

( * ) Notice: Subject to any disclaimer, the term of this patent is extended or adjusted under 35 U.S.C. 154(b) by 0 days.

(21) Appl. No.: 09/079,304

(22) Filed: May 15, 1998

(51) Int. Cl.[7] .................................................. H04M 1/738
(52) U.S. Cl. ............................................ 379/413; 379/399
(58) Field of Search ...................................... 379/399, 413

(56) References Cited

U.S. PATENT DOCUMENTS 5,511,118 * 4/1996 Gores et al. ......................... 379/399
5,659,608 * 8/1997 Stiefel .................................. 379/399
5,721,774 * 2/1998 Stiefel .................................. 379/413
5,737,411 * 4/1998 Apfel et al. ........................... 379/413
5,854,839 * 12/1998 Chen et al. ........................... 379/413
5,881,129 * 3/1999 Chen et al. ............................... 379/5

* cited by examiner

Primary Examiner—Tālivaldis I. Šmits
(74) Attorney, Agent, or Firm—Rogers & Killeen

(57) ABSTRACT

A subscriber loop interface circuit is provided that includes a current directing element for directing current from the output stage of line interface amplifiers. The current is directed to a secondary power supply having a magnitude lower than the conventional primary power supply of a subscriber loop interface circuit in supplying power to a subscriber loop.

21 Claims, 3 Drawing Sheets

BATTERY SWITCHING SUBSCRIBER LOOP INTERFACE CIRCUIT

BACKGROUND OF THE INVENTION

This invention relates to semiconductor subscriber loop interface circuits (SLIC's) and, more specifically, the invention relates to power management of subscriber loop interface circuits.

Telecommunication systems employ access products (e.g., remote terminals or subscriber interface units) for interfacing with each individual subscriber unit. An access product may include a SLIC for performing two to four wire conversion, battery feed, line supervision, and common-mode rejection. Together the SLIC, subscriber unit, and interface lines (e.g., TIP and RING lines) form a subscriber loop.

In a subscriber loop, the subscriber unit is generally powered from the SLIC through the interface lines. Typically, the SLIC must deliver 3 to 5 volts DC to a subscriber unit (e.g., a telephone) for off-hook states and deliver −42.5 to −56 volts DC (i.e., open circuit voltage levels) for on-hook states. SLIC's are generally powered with a −48 V power supply and are backed up with a power supply of the same magnitude.

A SLIC may be of the type that applies a voltage signal to the TIP and RING lines in an asymmetrical manner as illustrated in FIG. 1. For example, The SLIC may hold the voltage signal on the TIP line essentially constant (e.g., −4 Volts) while varying the voltage signal on the RING line (e.g., −4 to −44 Volts) according to a predetermined relationship between loop current and the load resistance (i.e., resistance across TIP and RING). The predetermined relationship may be constant current or constant voltage through an internal source resistance, either physically defined or simulated via feedback.

When installed, SLIC's are coupled to loads of variable resistance. The resistance being primarily a function of loop length. For short loop lengths (i.e., small resistance), the SLIC requires less than a conventional SLIC power supply to drive the subscriber loop. Excess power is dissipated in the output stages of line interface amplifiers on-board the SLIC. The power dissipation increases the SLIC operating temperature and decreases line interface reliability. Accordingly, the power management of SLIC's for widely variable loop lengths is a problem which has not been effectively solved since the inception of SLIC's over fifteen years ago.

Today, there is even a greater need for better power management and power reduction of SLIC's. In emerging telecommunication technologies, SLIC's are often installed in equipment that is located at a remote site not having access to a continuous power source. It is imperative for these technologies to have efficient and reliable SLIC operation.

In one known technique for power management, a SLIC is directly coupled to a conventional SLIC battery supply and coupled to second battery of the same magnitude through a discrete switch. To activate the discrete switch, a circuit detects loop voltage signals and compares loop voltage signals to an internal or external reference voltage. The circuit implementing this technique includes a loop voltage detect circuit, a comparator with hysteresis, two series high current bipolar devices (for switching), and an associated level shifter to operate the switches. In another known technique, the conventional SLIC power supply is replaced with a variable voltage power supply and complex switched mode power supply circuitry. In both techniques, the additional circuitry increases circuit complexity, size, density, operational temperature, and/or cost.

Accordingly, it is an object of the present invention to provide a novel method for efficiently powering a SLIC with a primary and a secondary voltage source.

It is another object of the present invention to provide a novel SLIC having a circuit for reducing the power consumption of the SLIC.

It is yet another object of the present invention to provide a novel SLIC having a circuit for automatically powering a subscriber loop by steering current to a secondary power supply.

It is still another object of the present invention to provide a novel SLIC having a circuit for varying the voltage of a secondary power supply as a function of the loop signals.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
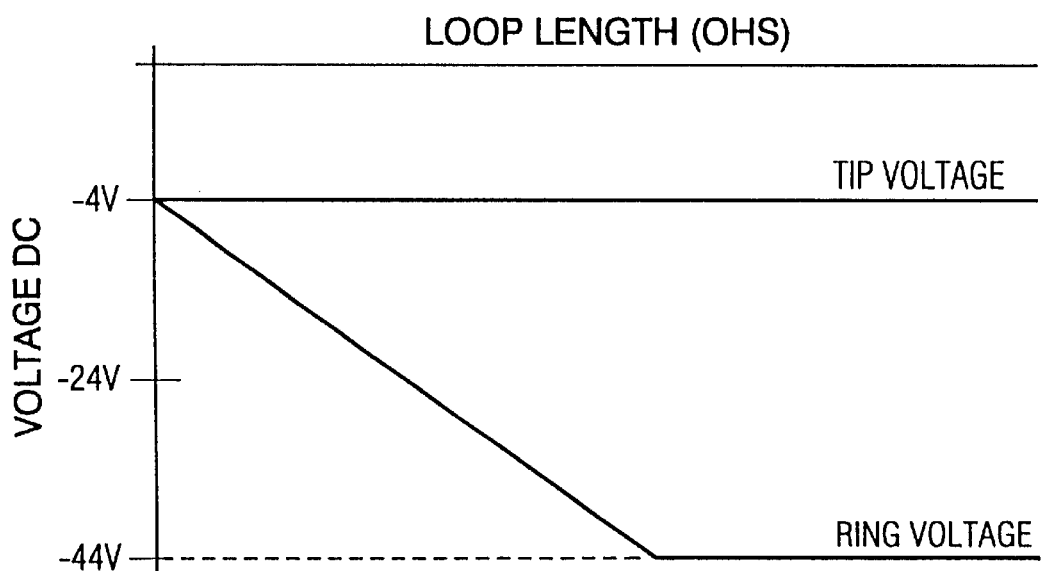
FIG. 1 is a graph illustrating desired TIP and RING line voltages in an asymmetrical voltage feed SLIC design.
Figure 2:
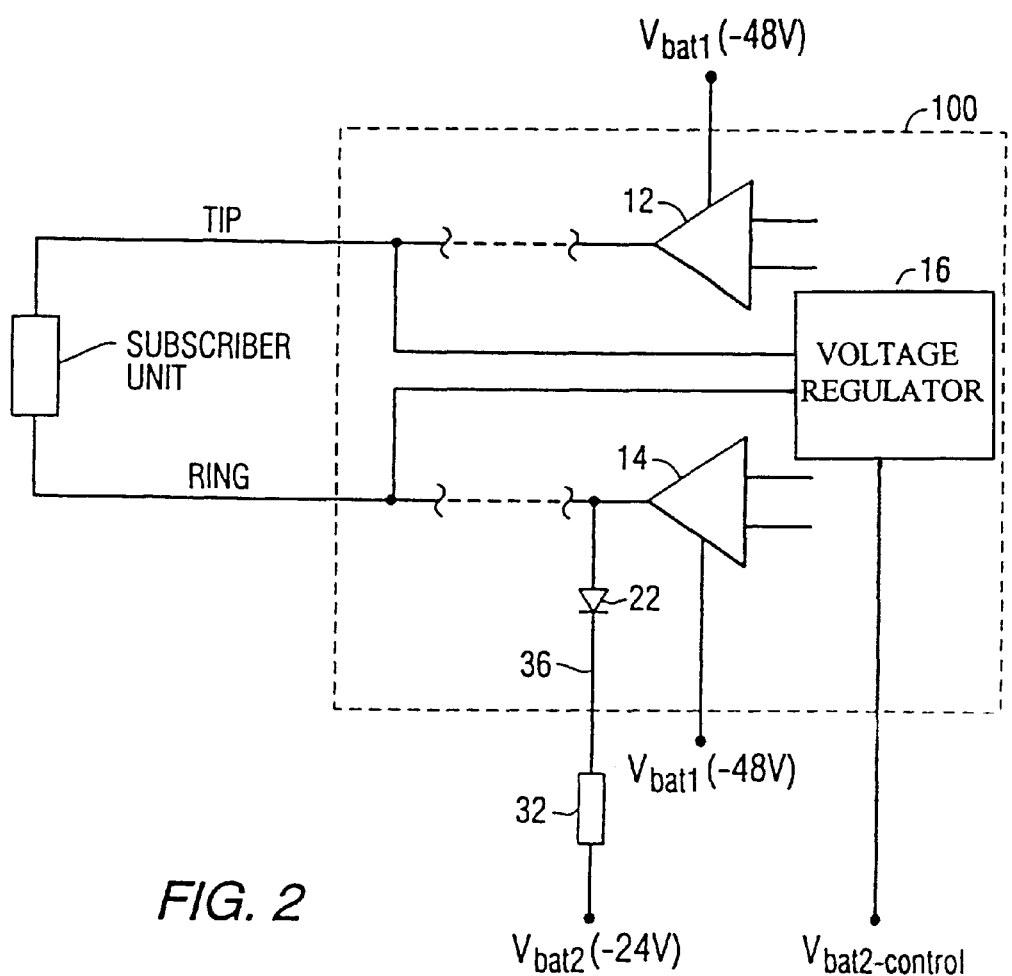
FIG. 2 is a schematic circuit diagram illustrating a subscriber loop incorporating one embodiment of the present invention.

With reference to FIG. 2, a SLIC 100 operating from a negative supply may include a TIP line amplifier 12, RING line amplifier 14, voltage regulator 16, and a diode 22.

The type of SLIC 100 may be a voltage feed/current sense or a current feed/voltage sense. The type of amplifier 12 and 14 may be voltage follower or transconductance amplifiers.

In operation, as loop resistance is decreased, the voltage on the output terminal of the RING amplifier 14 rises above $V_{bat1}$ (e.g., −48 Volts) according to a defined loop driving relationship of the SLIC. Current flows in diode 22, when the voltage on the output terminal of the RING amplifier 14 exceeds $V_{bat2}+V_d$, where $V_d$ is the drop across the diode 22 and $V_{bat2}$ may be −24 Volts. The diode activation directs or steers current from the output of the amplifier 14 to the secondary power supply $V_{bat2}$ through line 36 and resistive element 32. The current flowing in line 36 subtracts from the current flowing into the output stage of the RING amplifier 14. The point at which current flows in the diode is a function of diode parameters and the magnitude of the secondary power supply $V_{bat2}$.

The secondary power supply $V_{bat2}$ provides a second source of power for the SLIC in supplying power to the subscriber loop. The secondary power supply having magnitude less than the primary supply helps to reduce SLIC power consumption. The secondary power supply may provide up to all of the power needed for the SLIC to drive the loop. The magnitude of the secondary supply $V_{bat2}$ may be carefully selected to achieve minimum power consumption for a given loop length condition. Alternatively, the voltage controller 16 may generate a control signal $V_{bat2-control}$ on a terminal 34 for varying the magnitude of the secondary power supply $V_{bat2}$ as a function of sensed loop current or voltage signals. Methods of sensing loop current or voltage signals are generally known in the art.

Employing a resistive element 32 externally (as shown) or internally dissipates power above which is required by the SLIC. The resistive element 32 may be a resistor, transistor, or equivalent.

The transition of the current to path 36 is gradual and does not generate switching noise or sudden demands for power. Signal handling is impacted only slightly at the point of transition.

For SLIC's where on-hook detection requires full battery voltage, the SLIC 100 may automatically transition to the primary voltage supply $V_{bat1}$. The automatic transition is inherent to the described circuit. If the loop voltage drops to zero, as it would in the on-hook condition, the diode 22 becomes reverse biased and $V_{bat1}$ appears on the output terminal of the RING line amplifier 14 as controlled by one known SLIC line amplifier feedback technique.

Whether the directing element (i.e., the diode 22) is coupled to the output terminal of the TIP line amplifier 12 or RING line amplifier 14 is dependent on the differential polarity of the TIP and RING lines and the polarity of the SLIC power supply. For a SLIC operating from a negative voltage, current from the output of the more negative amplifier is directed to the secondary power supply. For a SLIC operating from a positive voltage, current from the output of the more positive amplifier is directed to the secondary power supply.

Figure 3:
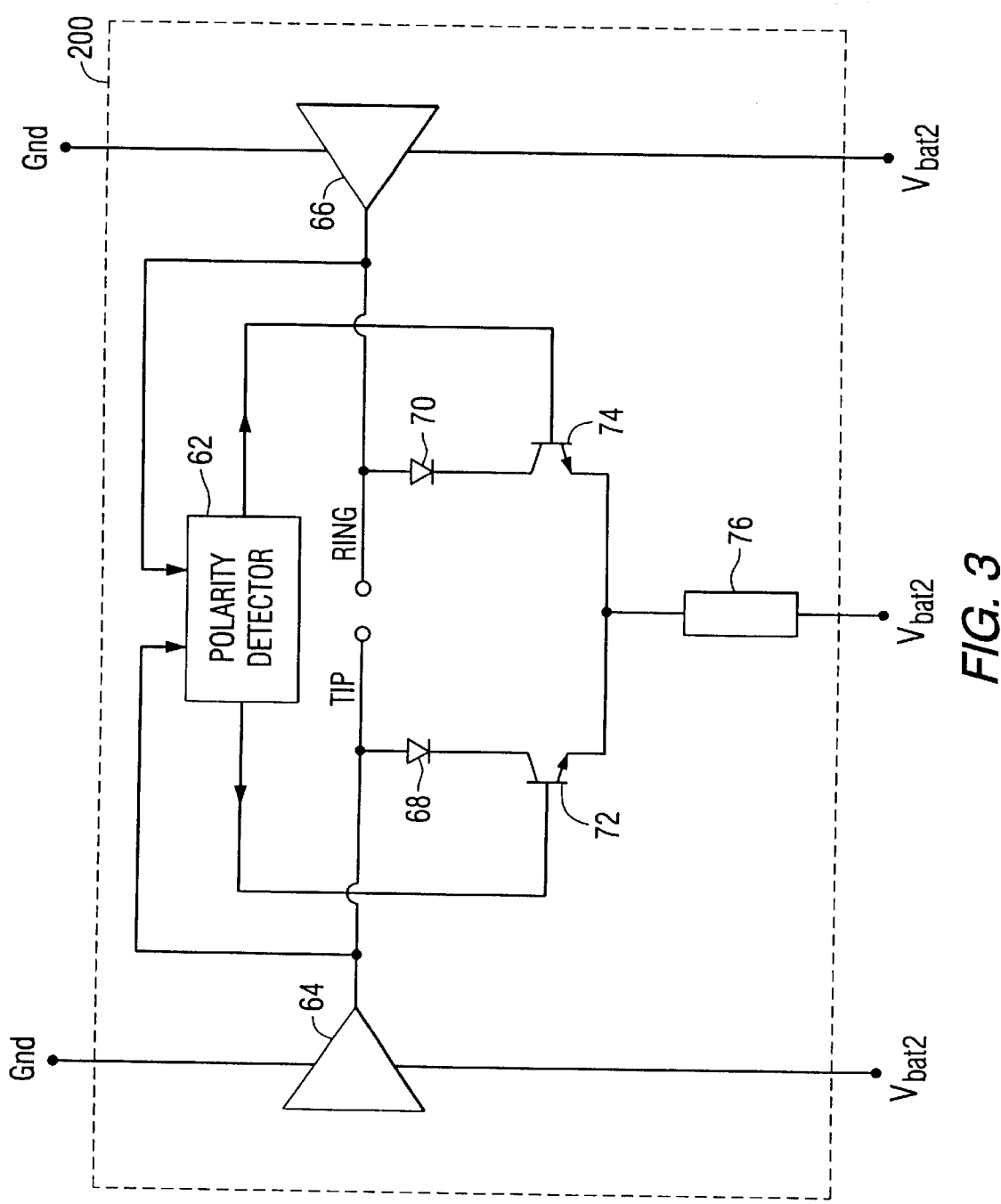
FIG. 3 is a schematic circuit diagram of a second embodiment of the present invention.

With reference to FIG. 3, a SLIC 200 of the type having polarity reversal of TIP and RING lines includes a polarity detector 62, TIP line amplifier 64, RING line amplifier 66, TIP line diode 68, RING line diode 70, TIP polarity transistor 72, and RING polarity transistor 74, and resistive element 76.

In operation, the polarity detector 62 determines the differential polarity across the output terminals of the TIP and RING line amplifiers and provides a base current to the appropriate transistor 72 or 74. The polarity of the SLIC power supply dictates to which transistor the base current is provided. For a negative power supply, the base current is provided to the transistor coupled to the more negative output terminal. For a positive power supply, the base current is provided to the transistor coupled to the more positive output terminal. The transistor 72 or 74 conducts only if the corresponding diode 68 or 70 is forward biased.

For example, when the polarity detector 62 determines that the TIP line is more negative than the RING line (assuming that the SLIC is operating from a negative voltage), a base current flows to TIP polarity transistor 72. When a base current flows to the TIP polarity transistor 72 and the TIP line diode 68 is forward biased, current flows in internal resistor 76 to $V_{bat2}$.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In an integrated circuit subscriber loop interface circuit having two line amplifiers, said integrated circuit subscriber loop interface circuit being of the type having variable power requirements, the improvement comprising:

a primary power supply operatively connected to each of said two line amplifiers;

a secondary power supply, having magnitude less than the primary power supply, operatively connected to the output terminal of one of said two line amplifiers;

means for sensing the power requirements and for reducing the power applied to said subscriber loop interface circuit as a function of the sensed power requirements.

2. The integrated circuit subscriber loop interface circuit of claim 1 wherein the secondary power supply is operatively connected to the output terminal of said one of said two line amplifiers through a resistive element and a diode connected in series, said diode being forward biased when the voltage at the output terminal of said one of said two line amplifiers exceeds the sum of the voltage of the secondary power supply and the voltage drop across said diode so that current is directed away from the output terminal of said one of said two line amplifiers and through said diode and said resistive element to said secondary power supply.

3. The resistive element of claim 2 wherein said resistive element is a resistor and is external to said integrated circuit subscriber loop interface circuit.

4. In an integrated circuit subscriber loop interface circuit of the type having variable power requirements, the improvement comprising means for sensing the power requirements and for reducing the power applied to said subscriber loop interface circuit as a function of the sensed power requirements:

wherein said subscriber loop interface circuit includes a primary power terminal adapted for connection to a primary power supply;

wherein said means includes a secondary power terminal adapted for connection to a secondary power supply having magnitude less than the primary power supply;

said subscriber loop interface circuit to be powered by the secondary power supply through said secondary power terminal to thereby reduce the power consumption of said subscriber loop interface circuit;

wherein said subscriber loop interface circuit includes two line interface amplifiers; and wherein said means includes a diode positioned in series between the output terminal of one of said two line amplifiers and said secondary power terminal for sensing the power requirements and for directing up to all of the current away from the output terminal of said one of said two line amplifiers to the secondary power supply.

5. The subscriber loop interface circuit of claim 4 further comprising:

dissipating means for dissipating the power in the current directed away from said output terminal.

6. The subscriber loop interface circuit of claim 5 wherein said dissipating means includes a resistive element responsive to said diode for dissipating power.

7. The subscriber loop interface circuit of claim 4 wherein said subscriber loop interface circuit includes two line interface amplifiers and wherein said means includes:

polarity detecting means for sensing the differential polarity across the output terminals of said two line interface amplifiers;

selecting means responsive to said polarity detecting means for selecting the output terminal of one of said two line interface amplifiers as a function of the sensed differential polarity; and directing means responsive to said selecting means for directing up to all of the current away from the selected output terminal to the secondary power supply.

8. The subscriber loop interface circuit of claim 7 wherein the directing means includes a diode positioned in series between the output terminal of each of said two line interface amplifiers and said secondary power terminal.

9. The subscriber loop interface circuit of claim 4 wherein said means includes an activation means responsive to voltage signals on said secondary power terminal and responsive to voltage signals on the output terminal of one of said two line interface amplifiers for directing the current away from the output terminal of said one of said two line interface amplifiers to said secondary power supply, thereby reducing the power consumption of said subscriber loop interface circuit.

10. The subscriber loop interface circuit of claim 9, wherein said activation means comprises a diode positioned in series between the output terminal of said one of said two line interface amplifiers and said secondary power terminal.

11. The subscriber loop interface circuit of claim 4 further includes a controlling means for controlling the voltage magnitude of the external secondary power supply as a function of sensed power requirements.

12. The subscriber loop interface circuit of claim 11 wherein said subscriber loop interface circuit includes a pair of terminal adapted to connect to subscriber lines for forming a subscriber loop to be powered by said subscriber loop interface circuit; and wherein said means includes voltage measuring means for measuring the voltage across said pair of terminals, thereby sensing the power requirements of said subscriber loop interface circuit.

13. The subscriber loop interface circuit of claim 11 wherein said subscriber loop interface circuit includes a pair of terminals adapted to connect to subscriber lines for forming a subscriber loop to be powered by said subscriber loop interface circuit; and wherein said means includes current sensing means for sensing the current in the subscriber loop, thereby sensing the power requirements of the said subscriber loop interface circuit.

14. A method of powering a subscriber loop interface circuit comprising two line amplifiers in supplying power to a subscriber loop comprising the steps of:

powering a subscriber loop interface circuit with a primary power supply;

sensing the power requirements of said subscriber loop interface circuit;

reducing the power consumption of said subscriber loop interface circuit as a function of sensed power requirements by powering said subscriber loop interface circuit with a secondary power supply having magnitude less than the primary power supply; and wherein the step of reducing the power consumption includes the step of directing up to all the current away from the output terminal of one of said two amplifiers to said secondary power supply.

15. The method of claim 14 further comprising the step of:

dissipating the power of the current directed away from the output terminal.

16. The method of claim 15 wherein the power is dissipated by flowing the current through a resistive element.

17. The method of claim 14 wherein up to all of the current is directed away by:

sensing the differential polarity across the output terminals of said two line amplifiers; and selecting one of said two line interface amplifiers as a function of the sensed differential polarity.

18. The method of claim 14 wherein the step of powering the subscriber loop interface circuit includes the step of:

varying the voltage magnitude of said secondary power supply as a function of the sensed power requirements.

19. The method of claim 18 wherein the power requirement is sensed by determining the voltage across the TIP and RING lines of the subscriber loop.

20. The method of claim 18 wherein the power requirement is sensed by determining the current in the subscriber loop.

21. A method of powering a subscriber loop interface circuit comprising two line amplifiers in supplying power to a subscriber loop comprising the steps of:

powering a subscriber loop interface circuit with a primary power supply;

sensing the power requirements of said subscriber loop interface circuit;

reducing the power consumption of said subscriber loop interface circuit as a function of sensed power requirements by powering said subscriber loop interface circuit with a secondary power supply having magnitude less than the primary power supply; and wherein the power requirements are sensed and the power consumption is reduced by applying a potential across a diode positioned in series between the output terminal of one of said two line amplifiers and said secondary power supply.

\* \* \* \* \*